Feb. 23, 1965  H. B. FUGE  3,170,424
POSITIONAL CONTROL SYSTEMS
Filed July 22, 1952  3 Sheets-Sheet 2

WITNESS:
William Martino

INVENTOR.
Harry B. Fuge
BY
ATTORNEY

Feb. 23, 1965

H. B. FUGE 3,170,424

POSITIONAL CONTROL SYSTEMS

Filed July 22, 1952

WITNESS:
William Martin

INVENTOR.
Harry B. Fuge
BY
J. G. Stanford
ATTORNEY

United States Patent Office 3,170,424
Patented Feb. 23, 1965

3,170,424
POSITIONAL CONTROL SYSTEMS
Harry B. Fuge, Somerville, N.J., assignor to The Singer Company, a corporation of New Jersey
Filed July 22, 1952, Ser. No. 300,285
8 Claims. (Cl. 112—219)

This invention relates to a control system for stopping a rotary shaft in a selected one of two pre-determined angular postions and more especially includes unitary means for driving said shaft at normal speed and at a reduced speed into its finally selected stop position.

It is an object of this invention to provide a means for controlling the positioning of a shaft, which system shall require, in addition to a driving connection, only a single simple rotary switch to be fastened to and driven by the shaft to be positioned.

A further object of this invention is to provide a simple positional control system having elements which, except for one simple unit, can be located away from the immediate vicinity of the shaft to be positioned, and thus does not interfere with the working operations taking place at or near to the shaft.

The objects of this invention have been attained by a novel arrangement of ordinary relays and contactors in an electrical control circuit using a single novel rotary detector element at the shaft to determine when the speed and position are correct for stopping.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the drawings, FIG. 1 is a longitudinal section through a unitary means for driving a shaft in a control system embodying the invention.

Figure 1:
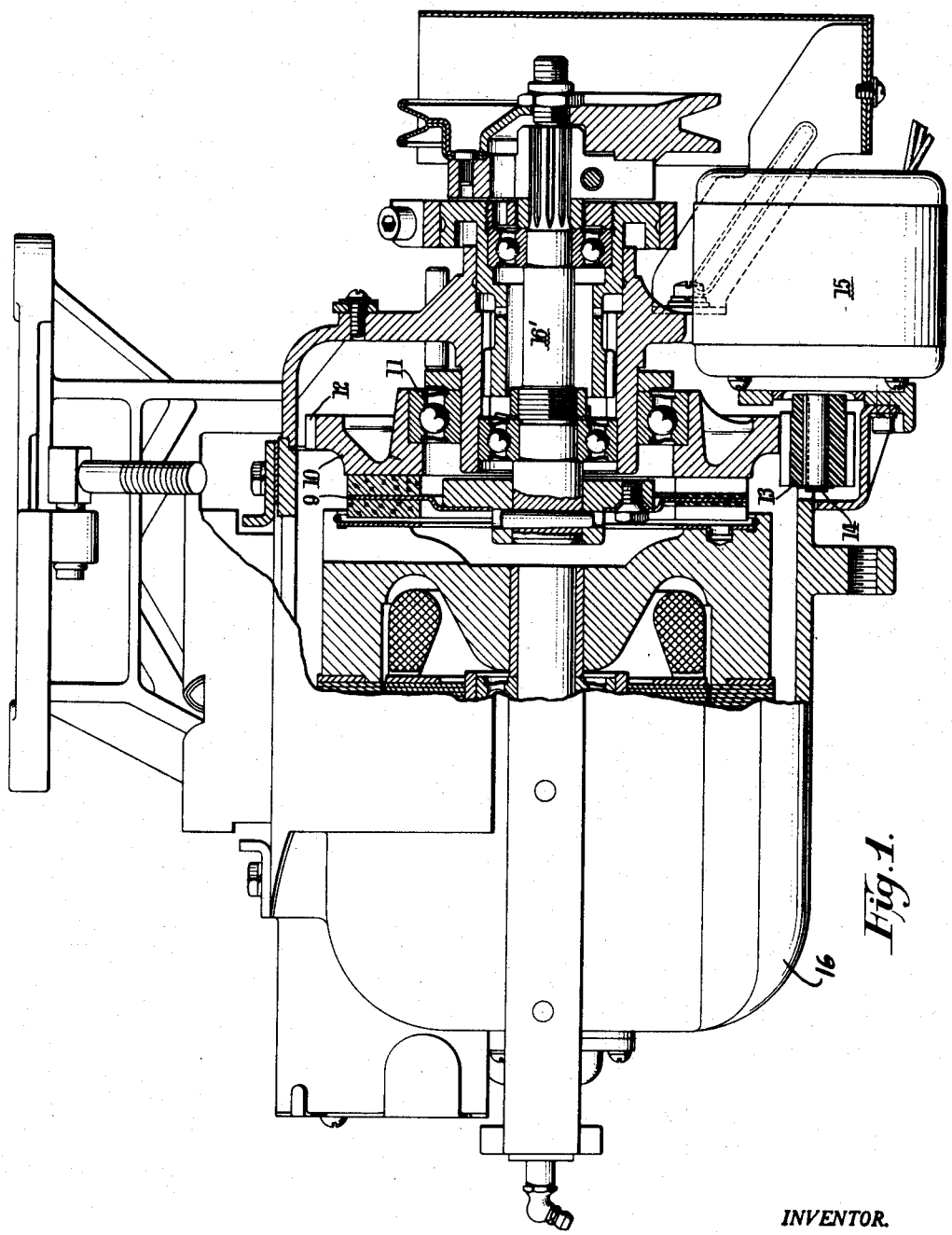

Referring now to FIG. 1 there is shown an electric power transmitter 16 of the type shown and described in the U.S. Patent No. 2,454,471 of James W. Momberg, November 23, 1948, to which reference may be had for a more complete description thereof. For the purposes of this invention, the transmitter has been modified in the following important respects: The brake-supporting ring 10, which formerly was stationary, is now mounted for rotation on a ball-bearing 11. The outer periphery of the brake ring is formed with teeth 12 which mesh with those of a pinion 13 carried by a shaft 14 of an auxiliary electric motor 15 mounted on the stationary frame of the transmitter. The auxiliary motor 15 is preferably a two-pole, three-phase induction motor of the type having a relatively low rotor inertia per unit torque output, and developes a substantial dynamic braking torque the A.C. line voltage is removed and a D.C. voltage is impressed on one phase. Preferably the full-load speed of the auxiliary motor is in the range of 2500 to 3200 r.p.m. and a gear-ratio of approximately 7 to 1 is used between the motor pinion 13 and the brake ring 10. It will be seen that, when the output shaft 16¹ is coupled to the brake ring 10 by endwise actuation of the driven element 9 responsive to heeling the treadle, the output shaft is driven at a speed of approximately 350 to 450 r.p.m. which is about one-eighth of the normal shaft speed when driven by the regular transmitter motor and represents, at the reduced speed, a stored kinetic energy only one sixty-fourth as much as at the high speed. This small kinetic energy can be quickly absorbed in bringing the sewing machine connected to the transmitter to a complete stop without undue heating or strain of the parts.

Figure 2:
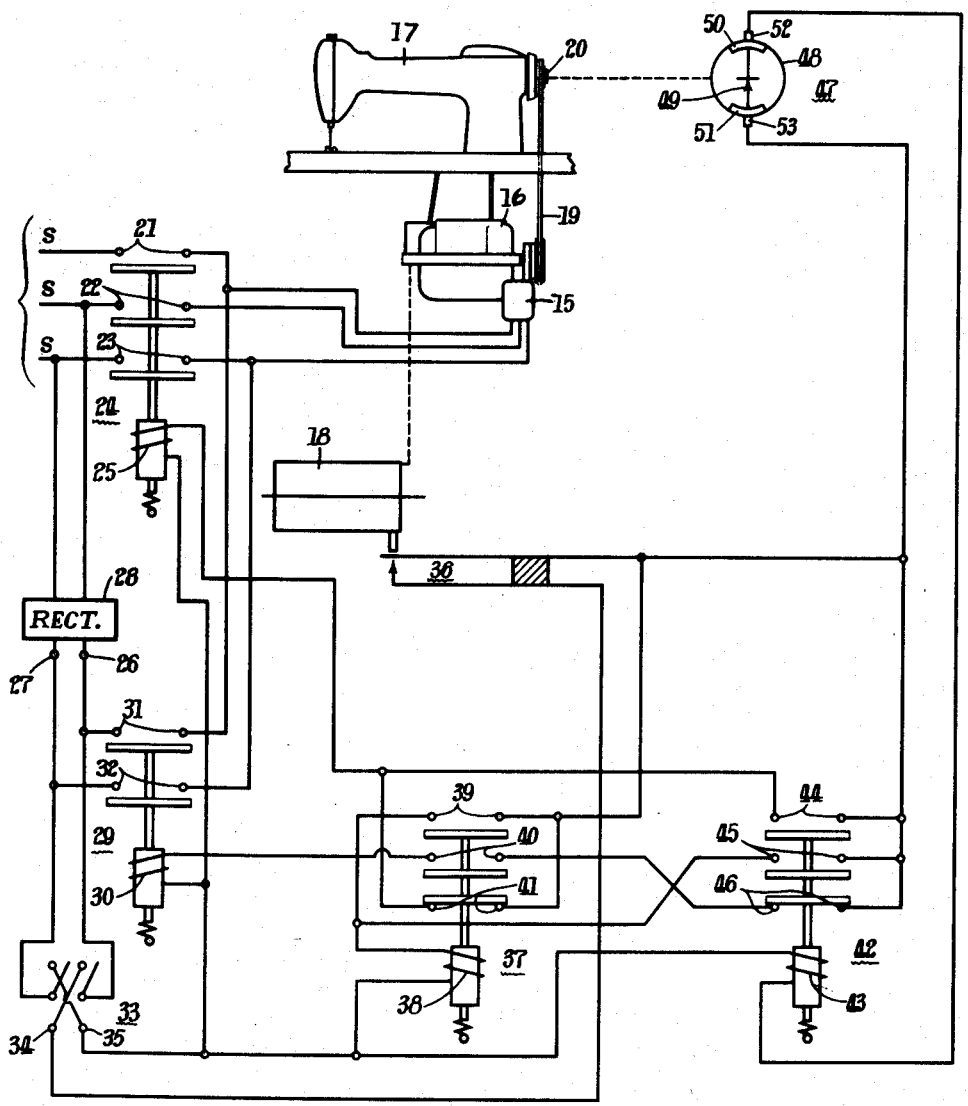
FIG. 2 is a diagrammatic illustration of a circuit for controlling the device of FIG. 1.

In the absence of any further equipment, the device described above permits a sewing machine 17, for example, connected to said transmitter 16 as shown in FIG. 2, to be driven either at a high speed or at a low speed depending on the position either of the treadle 18. It is desired, however, to provide stopping of the sewing machine selectively in either a "needle-up" or a "needle-down" position and this requires the determination of two factors, viz. shaft speed and angular position of the shaft. The shaft speed has to be low enough to limit the overtravel of the shaft, after braking is applied, to a safe range which guarantees that the needle will be wholly out of or wholly in the goods at standstill. It is also essential that the braking be initiated at some precise shaft position relative to the needle reciprocation in order to utilize the stopping range to best advantage These requirements are attained according to the present invention by a rotary pulsing switch element driven by the shaft to be positioned, said switch being connected to control the application of voltage from a supply source to a relay coil for effecting selective operation of the contacts of said relay. The rotary switch is so constructed as to apply a pulse of voltage to the relay coil for a single limited predetermined angular movement of the shaft in each revolution thereof. The relay armature has a certain amount of inertia so that, at high shaft speeds, the pulse rate is so fast that it cannot respond to operate the contacts when the pulse of voltage is applied. However, at some predetermined reduced speed, the relay will pick up and operate its contacts for each voltage pulse applied. This arangement thus provides a check both on the shaft speed and its position, by either closing a normally-open contact or opening a normally-closed contact when these conditions are satisfactory.

There are two similar control systems to be described; one employs direct-current operated elements and the other employs alternating-current operated elements. Referring now to FIG. 2, which illustrates the direct-current system, a conventional sewing machine 17 is driven by the transmitter 16, previously described, through the usual belt connection 19 to the arm shaft 20 and is controlled by a treadle 18. The auxiliary motor 15 may be connected to an A.C. source S through normally-open contacts 21, 22 and 23 of a contactor 24 having an operating coil 25. Direct-current voltage is provided at the output terminals 26 and 27 of a rectifier 28 connected to the A.C. source as shown. This rectifier 28 may be any of the conventional and well-known dry-disc units of the copper oxide or selenium types. A braking contactor 29, having an operating coil 30 and normally-open contacts 31 and 32, is employed to apply D.C. to one phase of the auxiliary motor 15 to effect dynamic braking thereof. A manually-operated reversing switch 33 is connected to terminals 26 and 27 of the rectifier and provides selectively at terminals 34 and 35 D.C. of either polarity depending on the position of the switch 33. The D.C. from the reversing switch is applied to the control elements through a normally-open pressure-sensitive switch 36 which is actuated by the regular treadle 18 to close when the treadle is heeled, which is the normal procedure in stopping the sewing machine 17. A transfer relay 37 has an operating coil 38, normally-open contacts 39 and 40, and normally-closed contacts 41, and a second relay 42 has an operating coil 43, normally-open contacts 44 and 45, and normally-closed contacts 46. Secured for rotation with the arm shaft 20 of the sewing machine 16 is a rotary pulsing switch 47 comprising a rotatable frame 48 to which is secured a uni-directional current element 49 such as a dry disc selenium rectifier connected at each end to a respective one of two contact segments 50 and 51 of limited circumferential extent. Two fixed brushes 52 and 53 are arranged 180° apart to bear intermittently on said segments as the shaft rotates. It will be seen that, due to the unidirectional conduction nature of the rectifier 49, current can traverse this switch in only one position per revolution of the arm-shaft 20, the current being blocked by the rectifier 49 for the opposite or 180° position. However, by operating the reversing switch 33 to reverse the polarity, the conducting position can be moved in phase by 180° and, in this manner, the "needle up" or the "needle down" position may be selected by manipulation of the switch, as will be explained presently.

*Operation*

In operation, and considering the sewing machine 16 to be running at full speed driven in the usual manner by the transmitter 16, the operator heels the treadle 18 which applies the driven element 9 to the surface of brake 10 which is, at the moment, stationary inasmuch as the auxiliary motor 15 is not running. At the same time, the treadle switch 36 is closed. A circuit is made from the terminal 26 of the rectifier 28, to terminal 34 of switch 33 (in the up position), thence through the treadle switch 36, contacts 41 of the transfer relay 37, through the operating coil 25 of the contactor 24 to terminal 35 of switch 33, to the other terminal 27 of the rectifier. The contacts 21, 22, 23 are thus closed connecting the auxiliary motor 15 to the A.C. source S and driving the brake ring 10. Due to the inertia of the sewing machine 17, the brake ring 10 has already begun its rotation when the motor 15 starts to rotate. As soon as the auxiliary motor 15, overdriven by the stored kinetic energy of the sewing machine, reaches 3600 revolutions per minute (its synchronous speed) it begins to act as an induction generator and rapidly absorbs the rotational energy of the sewing machine 17. A large part of this energy is also absorbed in the brake surfaces since the inertia forces of the motor are sufficient to give considerable braking torque. The result of all this is a rapid slowing down of the sewing machine 17. It will be seen that, with the treadle switch 36 closed, a circuit is also made from terminal 26 through the rotary switch 47 (when in proper position), through the operating coil 43 of the relay 42 to terminal 27, with the result that pulses of D.C. voltage are applied to the coil 43 once for every revolution of the shaft 20 when the proper conducting segment 50 or 51 is contacting the proper brush 52 or 53 to conduct current through the rectifier 49, as explained above. However, because of the initially high rotational speed of the shaft 20, the length of time during which current can flow through the switch 47 to the coil 43 is so small that the relay 42 does not at first operate. When, however, the sewing machine 17 has decelerated to a predetermined speed, the time duration of electrical impulse is sufficient to operate the relay 42, closing contacts 45 which places the operating coil 38 of the transfer relay 37 across the terminals 26, 27 thus operating said relay 37 to close its contacts 39, which locks in the relay. Closure of contacts 40 of the transfer relay 37 prepares a circuit through the operating coil 30 of the contactor 29, which circuit will be closed later through contacts 46 when the relay 42 drops out. At the same time, the contactor operating coil 25 is closed through the contacts 44 of the relay 42 so that when this relay drops out the contactor 24 opens to disconnect the motor 15 from the three-phase supply S. The rotary switch 47 opens its contact at the precise position to assure the sewing machine stopping with its needle in the up position or the down position depending on the setting of the reversing switch 33. At this precise position the A.C. is removed from and the D.C. is applied to the auxiliary motor 15, which is then dynamically braked to standstill before the arm-shaft 20 can turn far enough to supply the next pulse of voltage to the relay coil 43. Thereafter, normal toeing of the treadle 18 to again start the sewing machine 17 opens the treadle switch 36 removing the D.C. control voltage and restoring the control elements instantly to normal, in readiness for the next stopping cycle.

Figure 3:
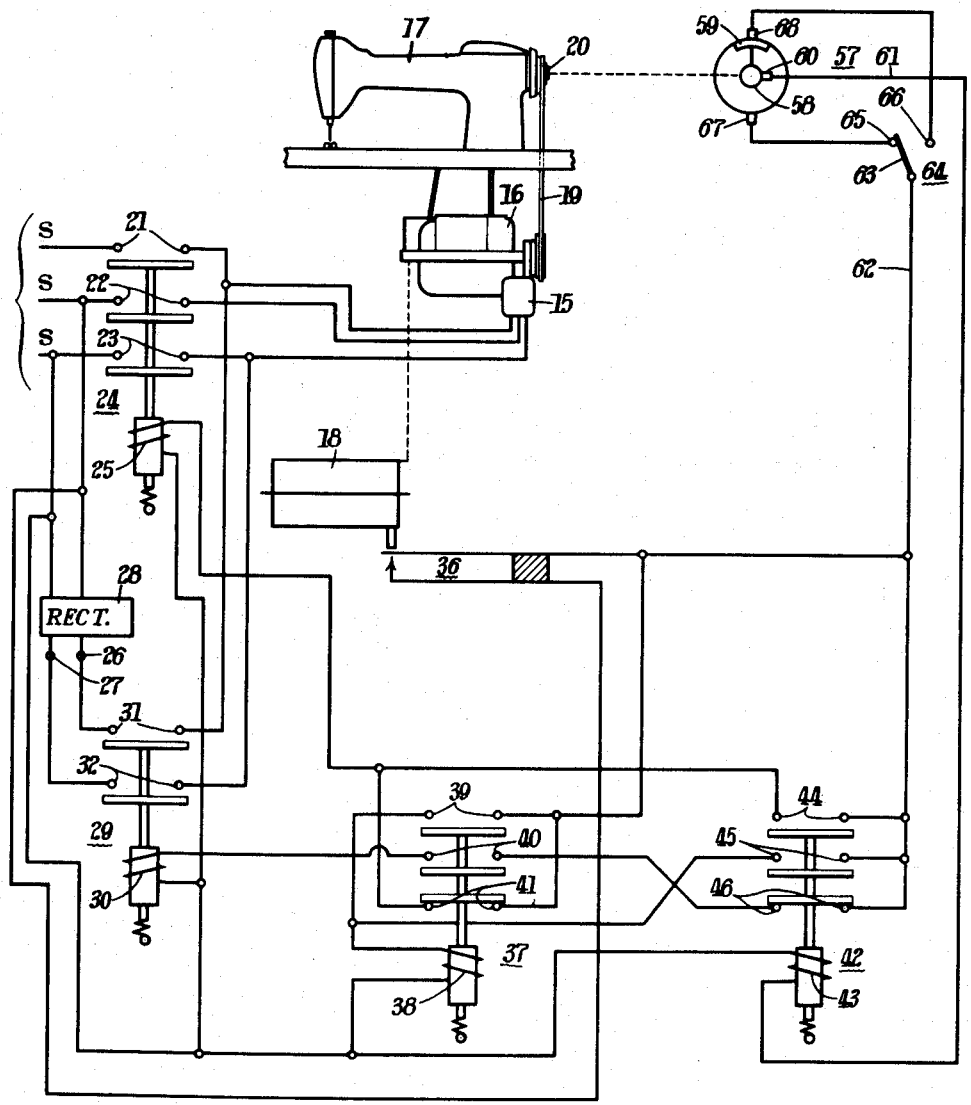
FIG. 3 is a diagrammatic illustration of a circuit modified from the circuit shown in FIG. 2.

The A.C. control system which is illustrated in FIG. 3 is quite similar to the D.C. control system described above, and differs therefrom mainly in having A.C. operating coils and a special rotary switch 57. The rectifier 28 is still employed but, in this instance, furnishes D.C. only for the auxiliary motor 15 to dynamically brake it. The rotary switch 57 in the A.C. system has been modified from that used in the D.C. system and, instead of the rectifier element 49, a slip-ring 58 is connected electrically to a single conducting segment 59 and a third brush 60 makes contact with the slip-ring 58 and connects to a lead 61. The other lead 62 is connected to the blade 63 of a single-pole double-throw switch 64, the contacts 65 and 66 of which each connect to a respective one of the 180° spaced brushes 67 and 68. This switch 64 takes the place of the reversing switch 33 of FIG. 2 and functions to select either the "needle-up" or the "needle-down" position by selectively placing in the circuit one of two brushes 67, 68 positioned 180° apart. Otherwise there are no changes except that the relays and contactors are of the A.C. operating type but no circuit change is necessary, and the operation is the same as described above with respect to the D.C. control system.

Figures 4, 5:
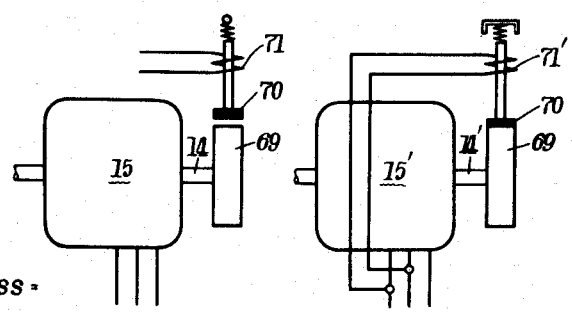
FIGS. 4 and 5 illustrate modifications of an element of the systems of FIGS. 2 and 3.

While the systems above have been described as employing dynamic braking of the auxiliary motor with the application of D.C. to the windings thereof, they are not to be construed as necessarily limited thereto, but include within their scope mechanical braking of the auxiliary motor by the application of D.C. to a solenoid brake in a manner well known and widely practiced in the art. FIG. 4 shows schematically how the motor 15 is modified to accomplish this. A brake drum 69 is connected to the shaft 14 and a brake shoe 70, normally biased in the off position, as shown, is operated by current in a solenoid 71 which is fed by leads from the terminals 31 and 32. That is to say, in this modified system, the brake solenoid 71, instead of the windings of the auxiliary motor 15, receives the direct current from braking.

It is also within the scope of this invention to employ a conventional brake motor 15' of the well known type shown and described, for example, in the U.S. Patent No. 2,434,034. In this case the solenoid brake is built into the motor itself and, as seen in FIG. 5, has a shoe 70 which is normally spring biased to a braked position against a brake drum 69 secured to the motor shaft 14', but which shoe is released when A.C. voltage is applied to the solenoid 71'. By connecting the solenoid to the terminals of the motor, as in FIG. 5, the application of A.C. voltage to start the motor will also release the brake shoe 70, and the removal of voltage from the motor 15 automatically will apply the brake shoe. In this case the contactor 29 may of course be dispensed with and the entire operation is then controlled by the contactor 24.

It will be understood that the control elements described above, except for the rotary switch 47 of FIG. 2 and 57 of FIG. 3, may be grouped together in a single control box and placed in any convenient place, even remote from the sewing machine itself.

Having thus set forth the nature of the invention, what I claim herein is:

1. A control mechanism for the stopping of electrically driven sewing machines in one or more predetermined positions of the needle bar, comprising a motor (17) for driving the sewing machine, brake means (15) for stopping the sewing machine, manually controlled means (18)

for operatively connecting and disconnecting the motor to and from the sewing machine, first and second electrical circuits, a switch (36) connected in the first circuit and operated by the manually controlled means so as to permit the energization of the first circuit when the motor is operatively disconnected from the machine, time-delay relay means (42) in the first circuit responsive after a time delay initiated by the operation of the switch to prepare a second circuit which, when closed, applies the braking means, and the first circuit including means (48) connected with positively operated parts of the sewing machine and operative in response to predetermined angular positions of the parts for closing the second circuit to brake the machine.

2. In a control system for stopping a rotary shaft in a predetermined angular position, a source of electrical energy, an electric motor for driving said shaft, brake means for stopping said motor, manually operative means for connecting said motor to said shaft, switch means responsive to said manually operative means for connecting said motor to said source of energy, relay means operative responsive to the speed of said shaft to prepare a circuit which, when closed, applies said brake means, said relay means including means operative responsive to the angular position of said shaft for closing said circuit to brake said shaft to standstill while connected to said motor.

3. In a control system for stopping a rotary shaft in a predetermined angular position, an electric motor for driving said shaft, a normal source of voltage for supplying said motor, an auxiliary source of voltage for braking said motor, relay means for disconnecting said normal source from and connecting said auxiliary source to said motor, and combined position and speed detector means rotatable with said shaft and comprising a uni-directional current-conducting element connected at each end to diametrically-opposed conducting segments of limited circumferential extent fixed to a rotatable frame driven by said shaft, and stationary brushes connected to said relay means, spaced apart by 180° and positioned to bear on said conducting segments in predetermined angular positions of said shaft to permit pulses of energy to be applied to said relay at a rate determined by the angular velocity of the shaft and at a time determined by the angular position of the shaft.

4. In a control system for stopping a rotary shaft in a predetermined one of two angular positions, a source of A.C. electrical energy, an electric motor for driving said shaft, braking means for stopping said motor, a source of D.C. electrical energy, control elements for said braking means connected to be supplied from said D.C. source through a combined speed and position detector device rotatable with said shaft and comprising a uni-directional current-conducting element connected at each end to diametrically-opposed conducting segments of limited circumferential extent fixed to a rotatable frame driven by said shaft, and stationary brushes spaced apart by 180° and positioned to bear on said conducting segments for a predetermined angular range of rotation of said shaft to permit a flow of current through said device for one only of such ranges per revolution of said shaft, and a switch for selectively reversing the polarity of said D.C. supply to permit a flow of current through a rotation range 180° out-of-phase with said first range.

5. In a control system for stopping a rotary shaft in a predetermined angular position, a source of electrical energy, a unitary driving device comprising high speed and low speed driving motors, means for braking said low speed motor, means for selectively connecting said rotary shaft to either one of said driving motors, means responsive to the connection of the low speed driving motor to said shaft to connect said low speed motor to said source of energy, means responsive to the speed of said shaft, including a relay and a switch for supplying voltage pulses to said relay, for preparing a circuit which is later closed, and means responsive to a predetermined angular position of said shaft to operate said switch and thereby close said circuit, disconnect said low speed motor from said source of energy and to apply said brake to said low speed motor to stop the motor and the rotary shaft connected thereto.

6. In a control system for stopping a rotary shaft in a predetermined angular position, the combination of a main driven shaft, a primary source of power, means releasably connecting said primary source of power with said driven shaft for driving the latter at a high rate of speed, an auxiliary electric motor having a drive shaft, means releasably connecting said auxiliary electric motor with said driven shaft for rotating the latter at a lower rate of speed, means responsive to the angular speed and to the angular position of said driven shaft for rendering said motor effective to rotate said driven shaft to said predetermined position; said last mentioned means comprising a uni-directional current-conducting element fixed to a rotatable frame driven by said driven shaft; and brake means operable upon said motor drive shaft to stop the shaft at this position while said driven shaft is connected to said motor.

7. In a control system for stopping a rotary shaft in a predetermined angular position, the combination of a main driven shaft, a primary source of power, means releasably connecting said primary source of power with said driven shaft for driving the latter at a high rate of speed, an auxiliary electric motor having a drive shaft, means releasably connecting said auxiliary electric motor with said driven shaft for rotating the latter at a lower rate of speed, means responsive to the angular speed and to the angular position of said driven shaft for rendering said motor effective to rotate said driven shaft to said predetermined position, and brake means operable upon said motor drive shaft to stop the driven shaft at this position while said driven shaft is connnected to said motor, said brake means comprising a relay and a rectifier for applying direct current to said motor.

8. In a control system for stopping a rotary shaft in a predetermined angular position, the combination of a main driven shaft, a primary source of power, an auxiliary electric motor having a driving shaft, a single friction clutch mechanism for alternatively connecting said primary source of power and said motor with said driven shaft thereby respectively to rotate said driven shaft at high and low rates of speed, means responsive to the angular speed and to the angular position of said driven shaft for rendering said motor effective to rotate said driven shaft to said predetermined position, and brake means to stop the shaft at this position while said shaft is connected to said motor, said brake means comprising a solenoid brake applied to said motor shaft.

References Cited in the file of this patent

UNITED STATES PATENTS

| Re. 15,125 | Lindquist | June 14, 1921 |
|---|---|---|
| 1,545,116 | Ashworth | July 7, 1925 |
| 1,951,689 | Callaway | Mar. 20, 1934 |
| 1,993,413 | Mellon | Mar. 5, 1935 |
| 2,404,850 | Knott | July 30, 1946 |
| 2,517,567 | Hill et al. | Aug. 8, 1950 |
| 2,561,346 | De Vlieg et al. | July 24, 1951 |
| 2,598,633 | Baldwin | May 27, 1952 |
| 2,612,127 | Hayes | Sept. 30, 1952 |
| 2,708,415 | White | May 17, 1955 |
| 2,747,715 | Brinkman | May 29, 1956 |

FOREIGN PATENTS

| 501,285 | Belgium | Feb. 28, 1951 |
|---|---|---|
| 509,072 | Belgium | Feb. 29, 1952 |
| 258,883 | Great Britain | Feb. 23, 1926 |
| 777,654 | France | Dec. 5, 1934 |
| 527,908 | Germany | June 23, 1931 |
| 648,478 | Germany | July 31, 1937 |